United States Patent [19]

Endo et al.

[11] Patent Number: 5,030,393
[45] Date of Patent: Jul. 9, 1991

[54] METHOD OF PRODUCING THERMOPLASTIC POLYMER FILM

[75] Inventors: Shigeki Endo; Hiroshi Sakanashi; Hideo Egami, all of Shizuoka, Japan

[73] Assignee: Fuji Photo Film Co., Ltd., Kanagawa, Japan

[21] Appl. No.: 404,490

[22] Filed: Sep. 8, 1989

[30] Foreign Application Priority Data

Sep. 8, 1988 [JP] Japan .................... 63-223426

[51] Int. Cl.⁵ .............................. B29C 39/42
[52] U.S. Cl. ........................ 264/22; 264/24; 264/216; 425/174.8 E
[58] Field of Search ............ 264/22, 24, 216; 425/174.8 E

[56] References Cited

U.S. PATENT DOCUMENTS

| | | | |
|---|---|---|---|
| 3,223,757 | 12/1965 | Owens et al. | 264/22 |
| 3,655,307 | 4/1972 | Hawkins | 264/24 |
| 3,820,929 | 6/1974 | Busby et al. | 264/24 |
| 4,129,630 | 12/1978 | Etchu et al. | 264/22 |
| 4,244,894 | 1/1981 | Segransan et al. | 425/174.8 E |
| 4,268,464 | 5/1981 | Yoshino et al. | 264/22 |
| 4,534,918 | 8/1985 | Forrest, Jr. | 425/174.8 E |
| 4,650,411 | 3/1987 | Hassmann et al. | 425/174.8 E |

FOREIGN PATENT DOCUMENTS

| | | | |
|---|---|---|---|
| 48-14785 | 5/1973 | Japan | 264/24 |
| 51-41762 | 4/1976 | Japan | 264/22 |
| 56-2126 | 1/1981 | Japan | 425/174.8 E |
| 58-163624 | 9/1983 | Japan | 264/22 |
| 60-120028 | 6/1985 | Japan | 264/22 |

*Primary Examiner*—Jeffery Thurlow
*Attorney, Agent, or Firm*—Sughrue, Mion, Zinn, Macpeak & Seas

[57] ABSTRACT

A method for producing a thermoplastic polymer film is disclosed. A melted thermoplastic polymer is extruded from a die onto a rotary cooling body, static electricity is impressed on the rotary cooling, body through a main electrode provided close and parallel to the cooling body and the film is solidified by cooling which method is characterized by providing at least one ungrounded auxiliary electrode composed of a conductive material unconnected to the main electrode and disposed at least on one side of the main electrode parallel to the rotary cooling body.

3 Claims, 1 Drawing Sheet

METHOD OF PRODUCING THERMOPLASTIC POLYMER FILM

BACKGROUND OF THE INVENTION

1. Field of the Invention

This invention relates to a method of producing a thermoplastic polymer film utilizing the electrostatic application method.

2. Description of the Prior Art

The electrostatic application method comprises, in a manufacturing process of a film by the extrusion of a melted thermoplastic polymer, providing a wire or plate electrode between a die and a rotary cooling body, depositing an electrostatic charge on the surface of the film in a melted state by using the rotary cooling body as the counter electrode, and allowing the film to adhere uniformly on the surface of the rotary cooling body to thereby cool the film rapidly. The electrostatic application method is disclosed in U.S. Pat. No. 3,223,757, Japanese Patent KOKOKU Nos. 48-3535, 48-14786, 48-29311 and the like.

The electrostatic application method is excellent for preventing the slip of the film and the entrapment of air, and for reducing the shrinkage of the film in the cross direction caused by the rapid cooling. However, when the production speed is elevated in order to raise the productivity, the electrostatic charge deposited per an unit area of the film on the surface of the rotary cooling body decreases according to the increase of the circumferential speed of the cooling body. As a result, the adhesive force is decreased, and air is trapped between the film and the surface of the cooling body. In such a state, the efficiency of heat transfer between the film and the rotary cooling body is decreased by the tapped air layer, and the flatness of the film is damaged by the trapped air bubbles between the film and the rotary cooling body. When the impressed voltage to the wire electrode is elevated in order to increase the adhesive force, a sufficient electrostatic application cannot be achieved. Particularly, there is an upper limit in the impressed voltage due to the generation of spark discharge between the wire and the rotary cooling body or the film. Moreover, the spark discharge between the wire and the rotary cooling body results in scarring of the surface of the rotary cooling body, and the spark discharge between the wire and the film generates pinholes on the film.

In order to compensate such a disadvantage of the electrostatic application method, various proposals have been made. For example, Japanese Patent KOKAI No. 53-14762 discloses a method for making uniform the turbulence of the electric field caused by the unevenness of a die surface by providing a shield composed of a laminate of a metal layer and an insulating layer between a wire electrode and a die surface faced thereto so that the insulating layer is disposed on the side of the wire electrode. Japanese Patent KOKAI No. 58-163624 discloses a method of extending the life of a wire electrode by providing a second electrode close to the wire electrode on the side opposite to the rotary cooling body, and impressing a voltage simultaneously on the second electrode and the wire electrode as the same kind of electrode. U.S. Pat. No. 4,650,411 discloses a method of inhibiting neck-in effect by providing a brush electrode on both edge portions of the rotary cooling body so as to face the cooling body. Japanese Patent KOKOKU No. 61-19415 discloses a method of improving the adhesion of the extruded film to the rotary cooling body by using a grounded auxiliary electrode, in addition to the main electrode of a metal wire, composed of a conductive material being planar or having an opening provided on the side opposite to the rotary cooling body. Japanese Patent KOKAI No. 51-146560 discloses a method of depositing the same kind of an electric charge on the surface of a thermoplastic polymer on the side not contacting the cooling body and on the surface provided with an insulating coating of a rotating roll disposed on the same side.

However, the above methods are still insufficient in view of increasing the density of electric charge and raising the directivity of the electric charge toward the extruded film for improving the adhesion of film in the electrostatic application method.

SUMMARY OF THE INVENTION

An object of the invention is to provide a method of producing a thermoplastic polymer film capable of elevating the circumferential speed of a rotary cooling body and producing a film having an uniform thickness.

The present invention provides a method of producing a thermoplastic polymer film which has achieved the above object, which comprises extruding a melted thermoplastic polymer from a die onto a rotary cooling body, impressing a static electricity on the rotary cooling body through a main electrode provided close and parallel to the cooling body and solidifying the film by cooling, which is characterized by providing an ungrounded auxiliary electrode composed of a conductive material disposed at least on one side of said main electrode almost parallel to the rotary cooling body.

DETAILED DESCRIPTION OF THE INVENTION

Figure 1:
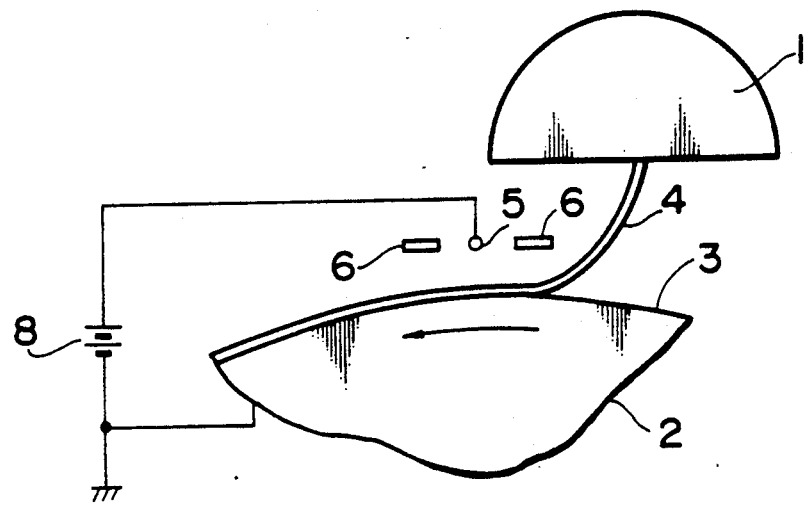
FIG. 1 and FIG. 2 are a partially side view of an apparatus used for conducting the method of the invention, respectively.

The main electrode has a shape of wire, brush, bar or the like, and is made of stainless steel, steel, tungsten, brass or the like. The distance between the main electrode and the film is usually about 1.5 to 40 mm, preferably about 5 to 15 mm, and the eletrostatic impressed voltage is usually about 2 to 40 KV, preferably about 12 to 20 KV.

The auxiliary electrode has the shape of a plate, wire or the like, and is made of stainless steel, steel, tungsten, brass or the like, similar to the main electrode. In order to make the auxiliary electrode effective, it is preferably disposed so as to satisfy the following relations. That is, when $r_1$ is the distance between the main electrode and the surface of the rotary cooling body in the radial direction of the cooling body, $r_2$ is the shortest distance between the main electrode and the auxiliary electrode on the side of the die, and $r_3$ is the shortest distance between the main electrode and the auxiliary electrode on the side opposite to the die, in the circumferential direction, $0.5\ r_1 \leq r_2 \leq 6\ r_1$ and $0.5\ r_1 \leq r_3 \leq 6\ r_1$. When $r_4$ is the distance between the auxiliary electrode on the die side and the surface of the rotary cooling body in the radial direction of the cooling body, and $r_5$ is the distance between the auxiliary electrode on the side opposite to the die and the surface of the rotary cooling body in the radial direction of the cooling body, in the radial direction of the cooling body, $0.5\ r1 \leq r4 \leq 2\ r1$ and $0.5\ r1 \leq r5 \leq 2\ r1$. When the auxiliary electrode is a plate, the angle between the plate and the circumferential direction of the cooling body is ±45 degrees, preferably ±30 degrees, particularly preferably about 0 degree. By disposing the auxiliary electrode(s) so as to satisfy the above relations, the ion concentration increases in the space between the main electrode and the auxiliary electrode, and nevertheless, spark discharge scarcely occurs. Electric charge is effectively discharged from the auxiliary electrode.

The method of the invention is applicable to every thermoplastic polymer material capable of being forming into a flat film by extrusion and cooling, and such a thermoplastic polymer material includes polystyrene, polyamide, polyvinyl chloride, and their copolymers, polyolefins such as polypropylene and their copolymers, polycarbonate and polyester which is a condensation polymerization product of a dibasic aromatic carboxylic acid and a dihydric alcohol. Polyethylene terephthalate films are particularly preferred.

In the electrostatic application method, the adhesion of a melted polymer film to the rotary cooling body depends on the deposited quantity of electric charge at the portion of the rotary cooling body to contact and solidify the film. Therefore, the adhesive force at the above portion increases by increasing the electric current of corona discharge generated between the main electrode and the rotary cooling body which works as a counter electrode. In the method of the invention, the corona discharge is generated even in a low voltage by the presence of the ungrounded auxiliary electrode disposed at least on one side of the main electrode, and the discharged electric current increases. This occurs becomes the corona discharge is generated over the broad space between, the main electrode and the auxiliary electrode to thereby increase the ion concentration. Moreover, since the auxiliary electrode is not grounded, the strength of the electric field is low between the main electrode and the auxiliary electrode. Therefore, spark discharge scarcely occurs therebetween, and the film is not damaged. The electric charge reaching the auxiliary electrode from the main electrode is discharged from the auxiliary electrode, and is accelerated toward the rotary cooling body which works as a counter electrode. Thus, the electric charge increases the deposited quantity of electric charge at the portion of the rotary cooling body to contact and solidify the film.

By applying the method of the invention, the adhesion of the film to the rotary cooling body is improved to thereby allow for a remarkable increase in the rotation speed of the rotary cooling body. Therefore, the productivity of the manufacturing process for the film can be improved. The pinholes caused by spark discharge are not generated. The shrinkage of the film in the cross direction is small, and the thickness of the film is uniform.

EXAMPLES

An example of the invention is illustrated in FIG. 1. A thermoplastic polymer is extruded from a die 1 onto the surface 3 of a rotary cooling body 2 containing a cooling mechanism by circulating cool water. The surface 3 of the rotary cooling body 2 is provided with mirror finish in order to obtain a flat film face. A wire-shaped main electrode 5 is provided between the die 1 and the rotary cooling body 2 slightly offset in the direction of the rotation of the rotary cooling body die 1 and in parallel to the rotary cooling body 2. The main electrode 5 is connected to the positive electrode of a power source 8, while the negative electrode and the rotary cooling body 2 are grounded. Plate-shaped auxiliary electrodes 6,6 are provided on both sides of the main electrode 5 in parallel to the rotary cooling body 2. The position of the auxiliary electrodes 6,6 is $r1 = 10$ mm, $r2 = r3 = 20$ mm and $r4 = r5 = 10$ mm. The width (the length in the circumferential direction) of the auxiliary electrodes 6,6 is 10 mm, and the thickness is 2 mm. The angle between the plate 6,6 and the circumferential direction of the cooling body 2 is zero degrees. The auxiliary electrodes 6,6 are not grounded. The main electrode 5 is impressed with a high voltage, and corona discharge is generated between the counter electrode of the rotary cooling body. Thereby, an electric charge of 15 KV is added to the film 4 to adhere the film onto the surface 3 of the rotary cooling body 2. The film 4 is cooled to solidify on the cooling body 2.

Figure 2:
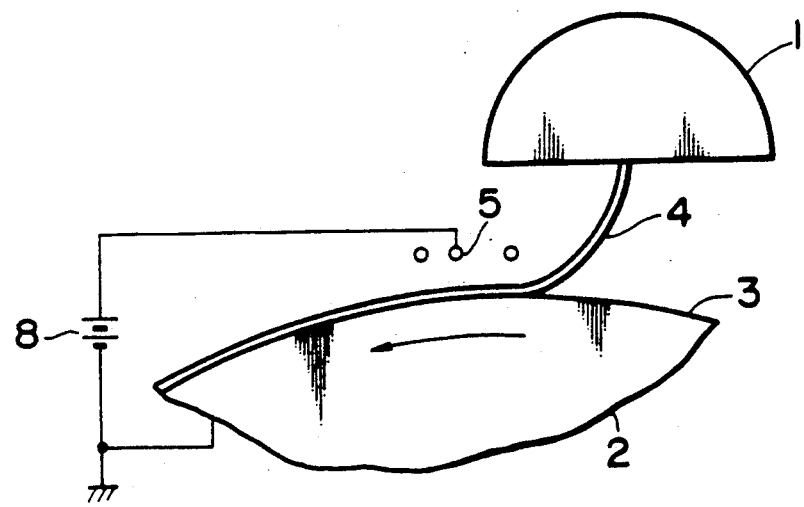

Another example is illustrated in FIG. 2. This example is the same as the above example, except that the auxiliary electrodes 6,6 are wire-shaped and disposed at the position of r2 and r3 in the above example.

Several examples were conducted to produce polyethylene terephthalate films. Example 1 was carried out as shown FIG. 1, and Example 2 was carried out like shown in FIG. 2. Comparative Example 1 was carried out like shown in FIG. 2 wherein the auxiliary electrodes were grounded. Comparative Example 2 was carried out using substantially the same apparatus as shown in FIG. 1 of U.S. Pat. No. 3,223,757. In every example, the rotation speed was gradually elevated together with elevating the increased voltage to the main electrode 5 to determine the highest rotation speed where film casting could be stably continued without the occurrence of air entrapment and spark discharge. The results are shown in Table 1.

TABLE 1

|  | Example | | Comparative | |
|---|---|---|---|---|
|  | 1 | 2 | 1 | 2 |
| Auxiliary Electrode | Present | Present | Present | None |
| Shape | Plate | Wire | Wire | — |
| Set Side | Both | Both | Both | — |
| Ground | None | None | Grounded |  |
| Rotation Speed (m/min) | >51.5 | >51.5 | 41.2 | 38.2 |

In the case of Comparative Example 1, it was observed that spark discharge was liable to occur.

We claim:

1. A method for producing a thermoplastic polymer film, comprising the steps of extruding a melted thermoplastic polymer from a die onto a rotary cooling body, impressing static electricity on the rotary cooling body through a main electrode provided close and parallel to the cooling body and solidifying the film by cooling, the improvement which comprises providing at least one ungrounded auxiliary electrode composed of a conductive material unconnected to the main electrode disposed at least on one side of said main electrode parallel to said rotary cooling body satisfying the following conditions:

In the circumferential direction of the rotary cooling body:

$$0.5\ r1 \leq r2 \text{ or } r3 \leq 6\ r1$$

r1: Distance between the main electrode and the surface of the rotary cooling body in the radial direction of the cooling body r2: Shortest distance between the main electrode and an auxiliary electrode on the side of the die r3: Shortest distance between the main electrode and an auxiliary electrode on the side opposite to the die In the radial direction of the rotary cooling body:

$0.5\ r1 \leq r4\ or\ r5 \leq 2\ r1$ r4: Distance between an auxiliary electrode on the die side surface of the rotary cooling body in the radial direction of the cooling body r5: Distance between an auxiliary electrode on the side opposite to the die and the surface of the rotary cooling body in the radial direction of the cooling body.

2. The method of claim 1 wherein an auxiliary electrode is provided on both sides of the main electrode.

3. The method of claim 2 wherein the auxiliary electrode is disposed so as to satisfy the following conditions:

In the circumferential direction of the rotary cooling body:

$0.5\ r1 \leq r2 \leq 6\ r1$ $0.5\ r1 \leq r3 \leq 6\ r1$ r1: Distance between the main electrode and the surface of the rotary cooling body in the radial direction of the cooling body r2: Shortest distance between the main electrode and the auxiliary electrode on the side of the die r3: Shortest distance between the main electrode a the auxiliary electrode on the side opposite to the die In the radial direction of the rotary cooling body:

$0.5\ r1 \leq r4 \leq 2\ r1$ $0.5\ r1 \leq r5 \leq 2\ r1$ r4: Distance between the auxiliary electrode on the die side and the surface of the rotary cooling body in the radial direction of the cooling body r5: Distance between the auxiliary electrode on the side opposite to the die and the surface of the rotary cooling body in the radial direction of the cooling body.

* * * * *